United States Patent [19]

Miyakawa et al.

[11] Patent Number: 4,492,746
[45] Date of Patent: Jan. 8, 1985

[54] ELECTROPHOTOGRAPHIC PHOTOSENSITIVE MATERIAL WITH POLYESTER BINDER

[75] Inventors: Nobuhiro Miyakawa, Abiko; Teruaki Higashiguti, Tokyo; Yumiko Sano, Ibaragi; Masatomi Funato, Sakai, all of Japan

[73] Assignee: Mita Industrial Co. Ltd., Osaka, Japan

[21] Appl. No.: 403,855

[22] Filed: Jul. 30, 1982

[30] Foreign Application Priority Data

Aug. 4, 1981 [JP] Japan ................... 56-121440

[51] Int. Cl.$^3$ .............................................. G03G 5/07
[52] U.S. Cl. ........................................ 430/71; 430/80; 430/96
[58] Field of Search ............................ 430/96, 71, 80

[56] References Cited

U.S. PATENT DOCUMENTS

| | | | |
|---|---|---|---|
| 3,647,432 | 3/1972 | Holstead | 430/82 |
| 3,709,684 | 1/1973 | Feltzin et al. | 430/96 X |
| 3,765,884 | 10/1973 | Shea | 430/78 |
| 3,923,509 | 12/1975 | Kuehn et al. | 430/96 X |
| 3,925,074 | 12/1975 | Wyhof | 430/96 X |
| 4,284,699 | 8/1981 | Berwick et al. | 430/96 |

FOREIGN PATENT DOCUMENTS 48-43144 12/1973 Japan ................... 430/96

*Primary Examiner*—Roland E. Martin
*Attorney, Agent, or Firm*—Sherman & Shalloway

[57] ABSTRACT

Disclosed is a photosensitive material for electrophotography comprising an organic polymeric photoconductive material and a thermoplastic polyester composed mainly of recurring units represented by the general formula

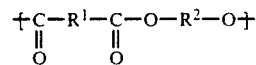

wherein $R^1$ represents a phenylene, ethylene or vinylene group, $R^2$ represents a group of the formula

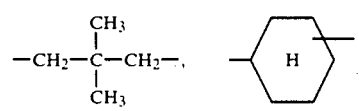

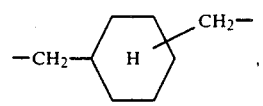

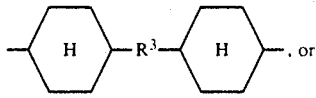

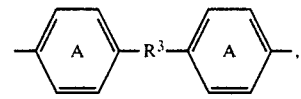

$R^3$ represents a direct bond or a divalent bridging atom or group, and the ring A may have a substituent inert to the polyester-forming reaction, provided that $R^1$ and $R^2$ are selected such that one of them contains an aromatic ring and the other does not.

5 Claims, No Drawings

ELECTROPHOTOGRAPHIC PHOTOSENSITIVE MATERIAL WITH POLYESTER BINDER

BACKGROUND OF THE INVENTION

1. Field of the Invention

This invention relates to an electrophotographic photosensitive material, and more particularly, to an improvement in and relating to an organic polymeric photoconductive material whose mechanical strength and adhesion to an electrically conductive substrate are increased without a deleterious effect on its electrophotographic properties.

2. Description of the Prior Art

It is known that organic polymeric photoconductors such as poly-N-vinylcarbazole (to be sometimes abbreviated as PVK hereinafter) are film-forming by themselves, and a material comprising an electrically conductive substrate and coated thereon, a photoconductive layer composed of a charge transfer complex of such an organic polymeric photoconductor with an electron accepting substance (Lewis acid), for example, is used as a photosensitive material for electrophotography.

The organic polymeric photoconductors such as PVK have the defect that they are brittle in nature, and photosensitive materials prepared therefrom undergo easy peeling of the photoconductive layer from the substrate, and have low resistance to abrasion or impact. In order to remedy this defect, various attempts have been made to improve the adhesion of PVK to the substrate and the mechanical properties of a film of PVK itself by incorporating an organic high-molecular-weight polymer having no photoconductivity as a reinforcing agent in PVK. Various thermoplastic polyesters or polycarbonates are known as such a polymeric reinforcing agent, and for example, Japanese Laid-Open Patent Publication No. 57440/1975 discloses that a thermoplastic aromatic polyester derived from bisphenol A and a benzenedicarboxylic acid is used as a reinforcing agent for PVK.

This thermoplastic aromatic polyester is generally satisfactory for the purpose of increasing the tensile strength of the photoconductive layer without much reducing the sensitivity of PVK, but the adhesion of the resulting photoconductive layer to a substrate and its surface hardness are still low. Hence, this polyester does not prove to be entirely satisfactory in regard to abrasion resistance.

SUMMARY OF THE INVENTION

It is an object of this invention therefore to provide a polyester-type reinforcing agent for organic polymeric photoconductors such as PVK, which can give a photoconductive layer having excellent strength and surface hardness as well as excellent adhesion to an electrically conductive substrate.

Another object of this invention is to provide an electrophotographic photosensitive material having an excellent combination of printing durability and electrophotographic properties such as sensitivity and an initial charge potential.

According to this invention, there is provided a photosensitive material for electrophotography comprising an organic polymeric photoconductive material and a thermoplastic polyester composed mainly of recurring units represented by the general formula $$+C-R^1-C-O-R^2-O+ \quad (1)$$
$$\;\;\;\; \| \;\;\;\;\;\;\;\; \|$$
$$\;\;\;\; O \;\;\;\;\;\;\;\; O$$

wherein $R^1$ represents a phenylene, ethylene or vinylene group, $R^2$ represents a group of the formula

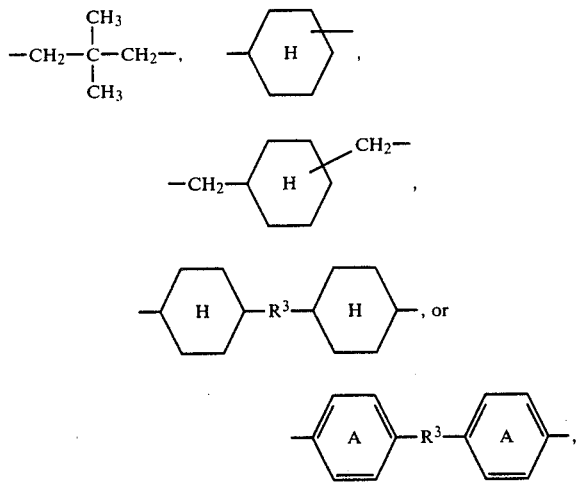

$R^3$ represents a direct bond or a divalent bridging atom or group, and the ring A may have a substituent inert to the polyester-forming reaction, provided that $R^1$ and $R^2$ are selected such that one of them contains an aromatic ring and the other does not.

The thermoplastic polyester used in this invention has some characteristics not observed in polyesters which have heretofore been used as reinforcing agents for PVK. A marked characteristic is that this thermoplastic polyester is formed by the condensation of a dibasic acid component selected from the group consisting of benzenedicarboxylic acids, succinic acid and fumaric acid and a diol component selected from the group consisting of neopentyl glycol, alicyclic glycols and bisphenols, and the dibasic acid component and the diol component are used in such a combination that one of them contains an aromatic ring and the other does not.

In order not to substantially decrease the sensitivity of a photoconductor layer containing an organic polymeric photoconductive material, it is preferred that the dibasic acid component of the polyester be an acid having a $\pi$ electron due to a carbon-carbon double bond, i.e. a benzenedicarboxylic acid or fumaric acid.

The use of neopentyl glycol, an alicyclic glycol or a bisphenol as the glycol component is important for increasing the solubility of the polyester in a solvent and its compatibility with an organic polymeric photoconductor such as PVK. For example, a polyester derived from a linear aliphatic diol such as tetramethylene glycol has poor solubility in a solvent as will be shown hereinafter.

Furthermore, it is essential in this invention that one of the dibasic acid component and the diol component should be aromatic and the other, non-aromatic. This is important for the objects of this invention described hereinabove, i.e. for improving the mechanical properties, adhesion and abrasion resistance of a PVK photoconductive layer without substantially reducing the sensitivity of the photoconductive layer, and for increasing the solubility of the polyester in an organic solvent thereby making it miscible with PVK. When a polyester derived from an aromatic dibasic acid component and an aromatic diol component is used, it is difficult to adhere the photoconductive layer firmly to a substrate, and its solubility in a solvent strongly tends to be reduced. The use of a polyester derived from a non-aromatic dibasic acid component and a non-aromatic diol component greatly tends to reduce the sensitivity of the photoconductive layer, and an improvement in the mechanical properties of the photoconductive layer cannot be expected. According to this invention, the mechanical strength of the PVK photoconductive layer can be increased without substantially reducing its sensitivity by using an aromatic compound as one of the dibasic acid component and the diol component, and the solubility of the polyester in a solvent can be increased and the adhesion of the PVK photoconductive layer to an electrically conductive substrate can be increased by using a non-aromatic compound as the other.

As described above, when fumaric acid is used as the dibasic acid component in the present invention, a bisphenol of the following general formula

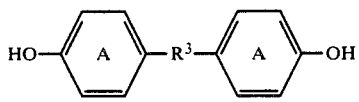
(2)

wherein $R^3$ represents a direct bond or a divalent bridging atom or group, and the ring A may be substituted by a substituent inert to the polyester-forming reaction, such as a halogen atom, is used as the diol component. Examples of the divalent bridging atom or group include an oxygen atom (=O), a sulfur atom (=S), a sulfonyl group (=SO$_2$), a carbonyl group (=CO), or groups of the following formula

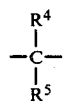
(3)

wherein each of $R^4$ and $R^5$ represents a hydrogen atom, an alkyl group having not more than 6 carbon atoms, or an aryl group having not more than 12 carbon atoms, and two alkyl groups $R^4$ and $R^5$ may be linked together to form an alkylene group.

Examples of suitable bisphenols for use in this invention include 2,2-bis(4-hydroxyphenyl)propane [bisphenol A], 2,2-bis(4-hydroxyphenyl)butane [bisphenol B], 1,1-bis(4-hydroxyphenyl)ethane, bis(4-hydroxyphenyl)methane, 4,4'-dihydroxybiphenyl, 4-hydroxyphenyl ether, and tetrabromobisphenol A.

When a benzenedicarboxylic acid, i.e. phthalic acid, isophthalic acid or terephthalic acid, is used as the dibasic acid component in this invention, an aliphatic diol or neopentyl glycol is used as the diol component.

The alicyclic diol includes, for example, ring-hydrogenated products of the bisphenols of formula (2), i.e. glycols of the following formula

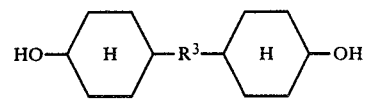
(4)

wherein $R^3$ is as defined, hexahydroxylylene glycol and cyclohexane glycol. Polyesters containing these alicyclic glycols achieve an especially good improvement in their solubility in solvents and the adhesion of the photoconductive layer to a substrate. From this viewpoint, it is particularly desirable in this invention to use such an alicyclic diol either alone or in combination with neopentyl glycol when the benzenedicarboxylic acid is used as the dibasic acid component.

Examples of suitable thermoplastic polyesters for use in this invention include poly[2,2-bis(4-hydroxyphenyl)-propane fumarate], poly(1,4-cyclohexane dimethanol isophthalate), poly[2,2-bis(4-hydroxycyclohexyl)propane phthalate], poly(1,4-cyclohexane isophthalate), poly(neopentane/1,4-cyclohexane dimethanol terephthalate), poly(1,4-cyclohexane/neopentane terephthalate), poly[neopentane/2,2-bis(4-hydroxycyclohexyl)propane terephthalate/isophthalate], poly[1,4-cyclohexane/2,2-bis(4-hydroxycyclohexyl)-propane isophthalate], and poly(1,4-cyclohexane/neopentane terephthalate/isophthalate).

The thermoplastic polyester used in this invention has a reduced viscosity, defined by the following equation:

$$\text{reduced viscosity} = \eta_{sp}/c$$

wherein $\eta_{sp}$ is the specific viscosity measured at 25° C. in tetrachloroethane in a concentration of 0.5 g/dl, and c is the concentration of the polyester in the mixed solvent (0.5 g/dl), of at least 0.05 dl/g, preferably at least 0.1 dl/g.

Polyesters especially suitable for the objects of this invention generally have a softening point (measured by the ring and ball method) of 60° to 200° C.

The polyester used in this invention is obtained by a polycondensation method known per se using each of the specified glycols as the diol component. For example, it can be easily obtained by reacting the diol component and the dibasic acid component in the molten state, if required in a stream of carbon dioxide gas, under such conditions that water distills but the diol component is refluxed.

Alternatively, the desired polyester can be easily obtained by heating a dimethyl ester of the dibasic acid and the diol in the presence of a catalyst at a temperature of 150° to 270° C. by an ordinary ester interchange reaction, distilling off methanol formed by the ester interchange reaction, and if required, distilling off the excess of the diol. The catalyst may be any known ester interchange catalyst such as antimony trioxide or an organic titanate (e.g., tetrabutyl titanate).

The desired polyester can also be produced by reacting an acid chloride of the dibasic acid and the diol in accordance with an ordinary interfacial polycondensation method or solution polycondensation method.

Examples of the organic polymeric photoconductive materials into which the thermoplastic polymer is to be incorporated are poly-N-vinylcarbazole, its ring-substituted products, polyvinyl anthracene, polyvinylpyrene and polyacenaphthylene. These organic polymeric photoconductive materials are electron-donating in nature and are generally used in the form of a charge transfer complex with an electron acceptor, for example Lewis acids such as a nitro compound such as 2,4,7-trinitrofluorenone, and a cyano compound such as tetracyanoquinodimethane in the formation of a photoconductive layer. Sensitization of the organic polymeric photoconductive material can of course be performed by spectral sensitization involving the addition of a thiapyrylium salt, a cyanine dye, a basic triphenylmethane dye, etc. or structural sensitization involving the addition of a polyhalogen compound in addition to the aforesaid chemical sensitization.

According to this invention, the thermoplastic polyester is incorporated in an amount of 10 to 300 parts by weight, preferably 15 to 150 parts by weight, per 100 parts by weight of the organic polymeric photoconductive material. The thermoplastic polyester used in this invention has the marked characteristic that it can be incorporated in a larger amount than conventional reinforcing agents without substantially reducing the sensitivity of the photoconductive layer. Thus, the addition of the thermoplastic polyester can strikingly improve the mechanical properties of the photoconductive layer and its adhesion to a substrate. If the amount of the polyester is below the above-specified lower limit, only an unsatisfactory improvement can be achieved in adhesion and mechanical properties. If it exceeds the above-specified upper limit, a reduction in sensitivity occurs unnegligibly.

The thermoplastic polyester used in this invention is soluble in solvents for organic polymeric photoconductors, for example tetrahydrofuran (THF), dimethylformamide (DMF), and chlorine-containing solvents such as tetrachloroethane. According to this invention, therefore, the thermoplastic polyester can be evenly and uniformly dispersed in the organic polymeric photoconductor.

An electrophotographic photosensitive material having a photoconductive layer is produced by coating a coating composition prepared by dissolving or dispersing the organic polymeric photoconductor material, the thermoplastic polyester and a sensitizer in a solvent of the above-exemplified types on an electrically conductive substrate known per se, and drying the coated layer. A sheet or drum of a metal, or a sheet or paper treated so as to be electrically conductive may be used as the electrically conductive substrate. The suitable amount on the photoconductive layer coated is 0.1 to 100 g/m², preferably 0.7 to 30 g/m², based on the dried layer.

The photoconductive composition containing the aforesaid polyester has very good adhesion to various electrically conductive substrates and excellent mechanical properties such as impact strength, folding or flexural strength, abrasion resistance, and tensile or bending strength. Moreover, its sensitivity and saturation charge potential are maintained at excellent levels.

The excellent advantages of this invention are illustrated by the following examples.

SYNTHESIS EXAMPLE 1

Bisphenol A (5.70 g; 0.025 mole) was added to a solution of 2 g (0.050 mole) of sodium hydroxide in 150 cc of water. They were slowly mixed in a mixer to form a solution.

Fumaryl dichloride (3.83 g; 0.025 mole) was put in a beaker, and dissolved in 100 ml of chloroform. To the solution in the mixer was added 15 ml of a 10% aqueous solution of a surface-active agent ("Dupono/ME", a product of Du Pont), and the mixture was stirred at the highest speed of the mixer. The chloroform solution of the acid chloride was added as rapidly as possible to the aqueous solution being vigorously stirred. The stirring was continued for 5 minutes while the mixer was covered with an aluminum foil to avoid scattering of the contents. The resulting suspension was poured into 1 liter of acetone to precipitate and coagulate the polymer. The polymer was separated by filtration, returned to the mixer, and washed with 500 ml of water to remove the salt and the dispersing agent. The polymer was again separated by filtration, washed on a funnel, finally washed with acetone, and dried in vacuo at 90° C. for 10 hours.

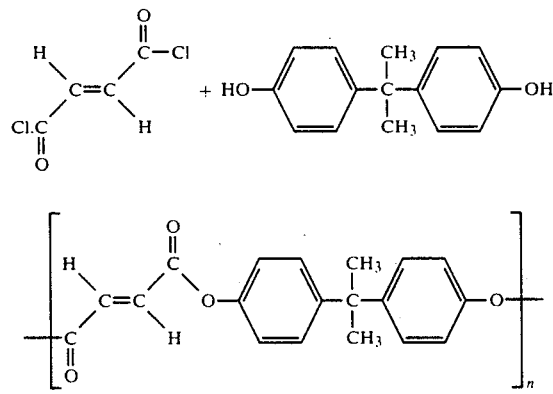

The polymer had a viscosity [η] of 0.37 (at 25° C. in tetrachloroethane) and a softening point of 170° C., and was soluble in dichloromethane and tetrachloroethane.

SYNTHESIS EXAMPLE 2

A 200 ml four-necked flask was fitted with a stirring rod, a thermometer, a nitrogen gas introducing tube, and a reduced-pressure suction tube, and charged with 6.77 g (1/30 mole) of isophthaloyl chloride, 3.95 g (1.02/30 mole), and 20 ml of o-dichlorobenzene. While nitrogen gas was passed through the flask, the mixture was heated with stirring. When the temperature exceeded 80° C., reaction set in and HCl gas began to evolve. The reaction was carried out at 80° to 150° C. for 1 hour. Then, the pressure was reduced and o-dichlorobenzene was removed by evaporation. The reaction was then continued for 1 hour under a pressure of 1 to 2 mmHg while maintaining the temperature at 200° C. The temperature was further raised to 250° C., and the reaction was carried out for 1 hour under a vacuum of 0.2 mmHg. The reaction was terminated by judging its end point from the rising speed of nitrogen gas bubbles, and the reaction mixture was cooled. A pale yellow clear amorphous polymer was obtained. The polymer was dissolved in 100 ml of tetrahydrofuran. The solution was filtered and then poured into 500 ml of methanol to precipitate the polymer. The polymer was separated by filtration, washed with methanol several times, and dried in vacuo at 90° C. for 10 hours.

The resulting polymer had a viscosity [η] of 0.17 (at 25° C. in tetrachloroethane, 5%) and a softening point at 170° C., and was soluble in dimethylformamide and dichloromethane.

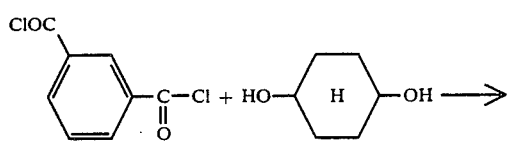

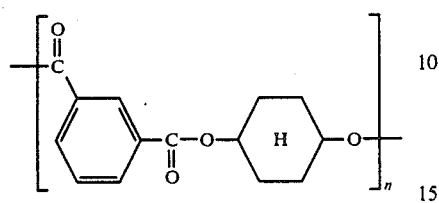

SYNTHESIS EXAMPLE 3

A 200 ml four-necked flask was fitted with a reflux condenser, a stirrer, a thermometer and a nitrogen gas introducing tube, and charged with 4.96 g (0.034 mole) of dimethyl succinate, 8.21 g (0.036 mole) of 2,2-bis(4-hydroxymethyl)propane and 0.02 g of tetra-n-butyl titanate. With stirring, the mixture was heated at 200° C. for 3 hours in a stream of nitrogen. Then, it was heated at 220° C. for 15 minutes to remove methanol. The reaction product was heated to 270° C. and polymerized for 2 hours under a vacuum of 0.2 mmHg. After cooling, the resulting pale yellow clear polymer was dissolved in 200 ml of tetrahydrofuran. The solution was filtered and poured into 500 ml of methanol to precipitate the polymer. The polymer was separated by filtration, reprecipitated with methanol, and dried in vacuo at 90° C. for 10 hours.

The polymer has a viscosity [η] of 0.29 (at 25° C. in tetrachloroethane, 0.5%) and a softening point of 140° to 150° C. and was soluble in tetrahydrofuran and methylene chloride.

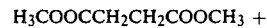

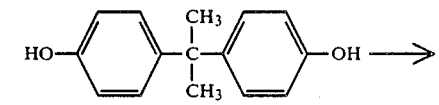

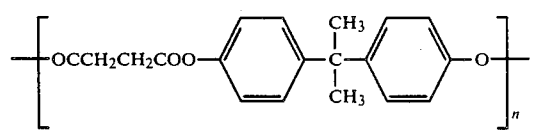

SYNTHESIS EXAMPLE 4

A 200 ml four-necked flask was fitted with a reflux condenser, a stirring rod, a thermometer and a nitrogen gas introducing tube, and charged with 6.5 g (0.034 mole) of dimethyl isophthalate, 17.76 g (0.072 mole) of 2,2-bis(4-hydroxycyclohexyl)propane and 0.02 g of tetra-n-butyl titanate. With stirring, the mixture was heated at 200° C. for 3 hours in a stream of nitrogen. Then, the mixture was heated at 220° C. for 15 minutes to remove methanol. The reaction mixture was heated at 270° C. and the pressure was reduced to 0.2 mmHg. Under these conditions, it was polymerized for 2 hours. After cooling, the resulting pale yellow crystalline polymer was dissolved in 200 ml of tetrahydrofuran. The solution was filtered, and then poured into 500 ml of methanol to precipitate the polymer. The polymer was separated by filtration, re-precipitated with methanol, and dried in vacuo at 90° C. for 10 hours.

The polymer had a viscosity [η] of 0.22 (at 25° C. in tetrachloroethane) and a softening point of 170° C. and was soluble in tetrahydrofuran.

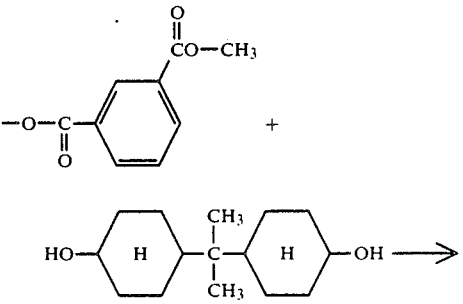

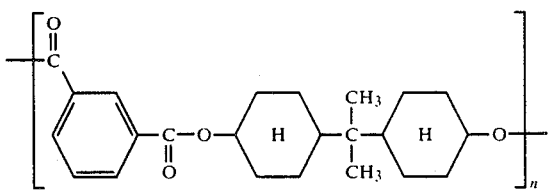

SYNTHESIS EXAMPLE 5

Dimethyl terephthalate (6.5 g; 0.034 mole), 6.5 g (0.034 mole) of dimethyl isophthalate, 17.76 g (0.072 mole) of 2,2-bis(4-hydroxycyclohexyl)propane and 7.49 g (0.072 mole) of neopentyl glycol were charged into a four-necked flask in the same way as in Synthesis Example 4, and after addition of 0.025 g of Ca(CH$_3$COO)$_2$.2-H$_2$O and 0.006 g of Sb$_2$O$_3$, subjected to ester interchange and polymerization to form a copolymer.

The resulting copolymer had a viscosity [η] of 0.28 (at 25° C. in tetrachloroethane) and a softening point of 160° C. and was soluble in tetrahydrofuran, dimethylformamide and methylene chloride.

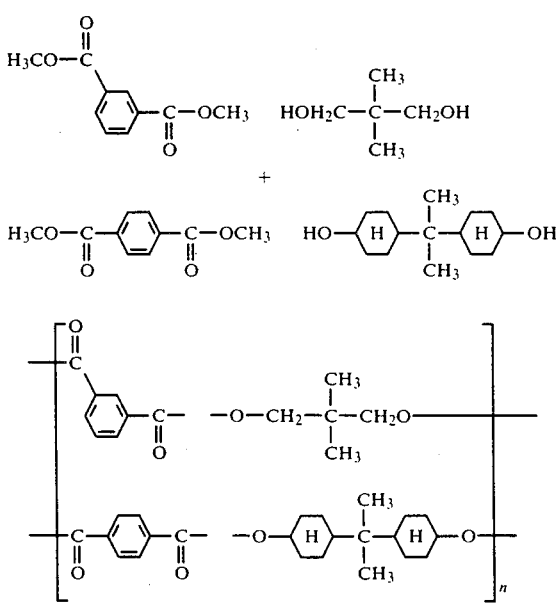

EXAMPLE 1

A 10 wt. % tetrahydrofuran (to be abbreviated THF) solution of each of the resins shown in Table 1 was prepared, and mixed with a 10 wt. % THF solution of poly-N-vinylcarbazole (to be abbreviated PVK) in a mixing ratio of 1:1. After observing the state of the mixed solution, it was coated by a wire bar on an anodized aluminum foil (100μ), and dried at 100° C. for 10 minutes. The coated layer had a thickness of about 3±0.2μ.

The coated product was subjected to a peel test by using an adhesive tape and a pencil hardness test to determine its adhesion and surface hardness, respectively. The results are shown in Table 1.

TABLE 1

| | Properties | | |
|---|---|---|---|
| Polyester resin | Compatibility with PVK (*1) | Adhesion (*2) | Surface hardness |
| Synthesis Example 2 | ◎ | O | 3H |
| Synthesis Example 3 | ◎ | O | 2H |
| Synthesis Example 4 | ◎ | O | 3H |
| Synthesis Example 5 | ◎ | O | 2H |

(*1): ◎ means that the mixed solution was clear and showed no whitening or phase separation.
(*2): O means that the coated layer did not peel off by the adhesive tape.

Polyesters were also prepared in the same way as in Synthesis Example 2 using terephthaloyl chloride as the dibasic acid component and tetramethylene glycol, neopentyl glycol, bisphenol A and decamethylene glycol respectively as the diol component. When tetramethylene glycol, decamethylene glycol and bisphenol A were used, the resulting polyesters were insoluble in THF, DMF and dichloromethane and only slightly soluble in tetrachloroethane, and gave unsatisfactory results in adhesion and surface hardness. When neopentyl glycol was used (Synthesis Example 6, [η]=0.19), the polyester was soluble in these solvents and had good compatibility with PVK, and gave a photoconductive layer having excellent adhesion to a substrate and high surface hardness.

EXAMPLE 2

The same tests as in Example 1 were performed using the polyester obtained in Synthesis Example 1 and a polyester (Synthesis Example 7, [η]=0.27) synthesized in accordance with Synthesis Example 5 from dimethyl terephthalate, neopentyl glycol and 1,4-cyclohexanedimethanol (mole ratio 2:1:1). Tetrachloroethane was used as an organic solvent. The results are shown in Table 2.

TABLE 2

| | Properties | | |
|---|---|---|---|
| Polyester resin | Compatibility with PVK (*1) | Adhesion (*2) | Surface hardness |
| Synthesis Example 1 | O | O | 3H |
| Synthesis Example 7 | Δ | O | 3H |
| PVK alone | — | X | H |

(*1): O means that whitening was scarcely noted. Δ means that a tendency to whitening was noted.
(*2): X means that the photoconductive layer easily peeled off by the adhesive tape.

EXAMPLE 3

A coating composition was prepared from 1 part by weight of Dian Blue (CI 21180), 2 parts by weight of 2,4,7-trinitrofluorenone, 90 parts by weight of tetrahydrofuran and a combination of poly-N-vinylcarbazole and the polyester of Synthesis Example 2 in each of the ratios shown in Table 3. It was coated on an anodized aluminum foil (100μ) by means of a wire bar and dried.

The electrophotographic properties of the resulting photosensitive material were examined by a commercial surface potentiometer (manufactured by Kawaguchi Electric K.K.), and the results are shown in Table 3 together with its adhesion and surface hardness.

TABLE 3

| | PVK/polyester ratio | | | | |
|---|---|---|---|---|---|
| Properties | 8/0 | 6/2 | 4/4 | 2/6 | 0/8 |
| When negatively charged | | | | | |
| Surface potential (V/μ) (*1) | −42 | −58 | −62 | −63 | −81 |
| Light Sensitivity (lux · sec) (*2) | 13 | 15 | 14 | 16 | 28 |
| When positively charged | | | | | |
| Surface potential (V/μ) | +40 | +55 | +55 | +60 | +80 |
| Light sensitivity (lux · sec) | 65 | 7 | 8 | 9 | 20 |
| Adhesion (*3) | X | Δ | O | O | O |
| Surface hardness | HB | 2H | 3H | 3H | 3H |

(*1): The surface potential was the potential per unit thickness of the film.
(*2): The light sensitivity was the amount of light required to decay the surface potential to one half.
(*3): Peeling by an adhesive tape evaluated as follows: O: no peeling, Δ: some peeling, X: complete peeling The above results led to the confirmation that by mixing the polyester in accordance with this invention with PVK, the charging properties, adhesion and surface hardness of the photoconductive layer can be improved without reducing its light sensitivity.

EXAMPLE 4

In each run, each of the polyesters shown in Table 4 was mixed with PVK in a weight ratio of 1:1, and a photosensitive material was produced in the same way as in Example 3. THF or tetrachloroethane was used as an organic solvent.

The properties of the photosensitive materials produced are shown in Table 4.

TABLE 4

| | Polyester Synthesis Example | | | | | |
|---|---|---|---|---|---|---|
| Properties | 1 | 3 | 4 | 5 | 6 | 7 |
| When negatively charged | | | | | | |
| Surface potential (V/μ) | −60 | −52 | −56 | −61 | −50 | −63 |
| Light sensitivity (lux · sec) | 15 | 16 | 16 | 15 | 17 | 17 |
| When positively charged | | | | | | |
| Surface potential (V/μ) | +51 | +49 | +53 | +56 | +50 | +57 |
| Light sensitivity (lux · sec) | 8 | 9 | 7 | 8 | 8 | 20 |
| Adhesion | O | O | O | O | O | O |
| Surface hardness | 3H | 2H | 3H | 2H | 3H | 3H |

What we claim is:
1. A photosensitive material for electrophotography comprising an organic polymeric photoconductive material selected from the group consisting of poly-N- vinyl carbazole and its nuclear substitutions, polyvinyl anthracene, polyvinylpyrene and polyacenaphthylene and a thermoplastic polyester composed mainly of recurring units represented by the general formula

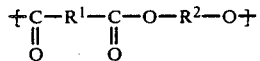

wherein $R^1$ is a phenylene group, $R^2$ is a group of the formula

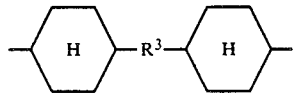

$R^3$ is a direct bond or a divalent bridging atom or group.

2. The photosensitive material of claim 1 wherein the amount of the thermoplastic polyester is 10 to 300 parts by weight, per 100 parts by weight of the organic polymeric photoconductive material.

3. The photosensitive material of claim 1 wherein the amount of the thermoplastic polyester is from about 100 to 300 parts by weight, per 100 parts by weight of the organic polymeric photoconductive material.

4. The photosensitive material of claim 1 wherein the thermoplastic polyester is composed mainly of recurring units represented by the formula

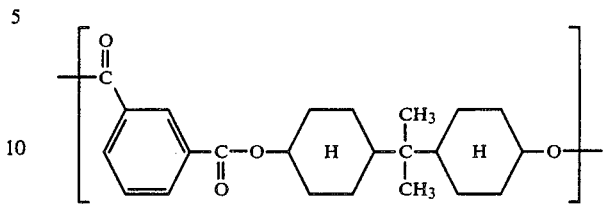

5. The photosensitive material of claim 1 wherein the thermoplastic polyester is composed mainly of recurring units represented by the formula

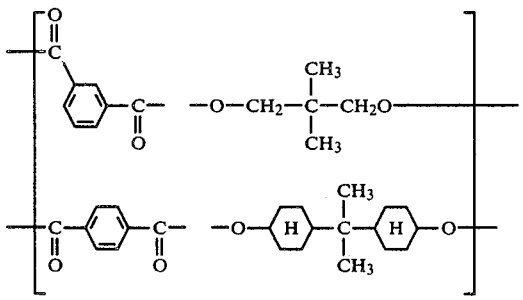

* * * * *